(12) United States Patent
Teal et al.

(10) Patent No.: US 7,648,664 B2
(45) Date of Patent: Jan. 19, 2010

(54) CLAMPED QUANTIZED FEED SYSTEM FOR SOLID FREEFORM FABRICATION

(75) Inventors: Brent Teal, Solana Beach, CA (US);
Ryan J. Theal, Escondido, CA (US);
Dave B. Petch, La Jolla, CA (US);
Thomas O'Regan, San Diego, CA (US);
Stephen M. Cunningham, San Marcos, CA (US)

(73) Assignee: 3D Systems, Inc., Rock Hill, SC (US)

( * ) Notice: Subject to any disclaimer, the term of this patent is extended or adjusted under 35 U.S.C. 154(b) by 644 days.

(21) Appl. No.: 11/258,729

(22) Filed: Oct. 25, 2005

(65) Prior Publication Data
US 2007/0090568 A1    Apr. 26, 2007

(51) Int. Cl.
*B28B 1/30* (2006.01)
(52) U.S. Cl. .......................... 264/308; 193/32; 221/239
(58) Field of Classification Search ................. 264/308, 264/7; 193/32; 221/9, 10, 11, 12, 18, 19, 221/20, 51, 52, 53, 239
See application file for complete search history.

(56) References Cited
U.S. PATENT DOCUMENTS

| | | | |
|---|---|---|---|
| 4,593,292 A | 6/1986 | Lewis | |
| 4,609,924 A | 9/1986 | De Young | |
| 4,631,557 A | 12/1986 | Cooke et al. | |
| 4,636,803 A | 1/1987 | Mikalsen | |
| 4,682,185 A | 7/1987 | Martner | |
| 5,280,300 A | 1/1994 | Fong et al. | |
| 5,555,176 A | 9/1996 | Menhennett et al. | |
| 5,779,103 A * | 7/1998 | Massena | 222/146.5 |
| 5,784,279 A | 7/1998 | Barlage, III et al. | |
| 6,170,942 B1 | 1/2001 | Ogawa et al. | |
| 6,902,246 B2 | 6/2005 | Varnon et al. | |
| 2003/0063138 A1 * | 4/2003 | Varnon et al. | 347/1 |

\* cited by examiner

*Primary Examiner*—Joseph S Del Sole
*Assistant Examiner*—John P Robitaille
(74) *Attorney, Agent, or Firm*—Ralph D'Alessandro; Keith A. Roberson

(57) ABSTRACT

A material feed system for solid freeform fabrication. The build material is delivered in discrete or quantized amounts by a clamp feed system in a non-flowable state to the dispensing device and the material is then changed to a flowable state prior to being dispensed. The feed system can be used to build three-dimensional objects in color, if desired. The clamped feed system is integrated with a waste removal system.

17 Claims, 6 Drawing Sheets

CLAMPED QUANTIZED FEED SYSTEM FOR SOLID FREEFORM FABRICATION

BACKGROUND OF THE INVENTION

1. Field of the Invention

The invention relates in general to a material feed system for solid freeform fabrication and, in particular, to a clamp feed system that can selectively feed discrete portions of material directly to a solid freeform fabrication device to build three-dimensional objects. Because the feed system is also quantized, the system can be used to build three-dimensional objects in color or to dispense more than one material. In addition, the feed system can be integrated with a sealed waste removal system wherein reactive materials can be handled without special handling procedures.

2. Description of the Prior Art

Recently, several new technologies have been developed for the rapid creation of models, prototypes, and parts for limited run manufacturing. These new technologies can generally be described as solid freeform fabrication, herein referred to as "SFF". Some SFF techniques include stereolithography, selective deposition modeling, laminated object manufacturing, selective phase area deposition, multiphase jet solidification, ballistic particle manufacturing, fused deposition modeling, particle deposition, laser sintering, and the like. In SFF, complex parts are produced from a modeling material in an additive fashion as opposed to conventional fabrication techniques, which are generally subtractive in nature. For example, in conventional fabrication techniques material is removed by machining operations or shaped in a die or mold to near net shape and then trimmed. In contrast, additive fabrication techniques incrementally add portions of a build material to targeted locations, typically layer by layer, in order to build a complex part.

SFF technologies typically utilize a computer graphic representation of a part and a supply of a build material to fabricate the part in successive layers. SFF technologies have many advantages over the prior conventional manufacturing methods. For instance, SFF technologies dramatically shorten the time to develop prototype parts and can quickly produce limited numbers of parts in rapid manufacturing processes. They also eliminate the need for complex tooling and machining associated with the prior conventional manufacturing methods, particularly when creating molds for casting operations. In addition, SFF technologies are advantageous because customized objects can be produced quickly by processing computer graphic data.

There are a wide variety of build materials that are used in various SFF techniques. These materials are typically applied in the form of a powder, liquid, gas, paste, foam, or gel. Recently, there has developed an interest in utilizing highly viscous paste materials in SFF processes to achieve greater mechanical properties. In addition, an interest has recently developed in reproducing visual features such as color on the three-dimensional objects produced by SFF processes. This has produced a need to develop special additives for the build materials along with new dispensing systems to enable the production of these visual features when building the three-dimensional objects.

One category of SFF that has emerged is selective deposition modeling, herein referred to as "SDM". In SDM, a build material is physically deposited in a layerwise fashion while in a flowable state and allowed to solidify to form an object. In one type of SDM technology the modeling material is extruded as a continuous filament through a resistively heated nozzle. In yet another type of SDM technology the modeling material is jetted or dropped in discrete droplets in order to build up a part. In one particular SDM apparatus, a thermoplastic material having a low-melting point is used as the solid modeling material, which is delivered through a jetting system such as those used in ink jet printers. One type of SDM process utilizing ink jet print heads is described, for example, in U.S. Pat. No. 5,555,176 to Menhennett, et al.

Because ink jet print heads are designed for use in two-dimensional printing, special modifications must be made in order to use them in building three-dimensional objects by SFF techniques. This is generally because there are substantial differences between the two processes requiring different solutions to different problems. For example, in two-dimensional printing a relatively small amount of a liquid solution is jetted and allowed to dry or solidify with a significant interest being given to print resolution. Because only a small amount of material is jetted in two-dimensional printing, the material reservoir for the liquid solution can reside directly in the ink jet print head while providing the ability to print numerous pages before needing to be refilled or replaced. In contrast, in SDM a normally solid material, such as a thermoplastic or wax material, must be heated to a flowable state in order to be jetted, and then allowed to solidify. Furthermore, in SDM dispensing resolution is not as critical as it is in two-dimensional printing. This is generally because, for each targeted pixel location, the amount of material to be jetted in SDM techniques is substantially greater than the amount to be jetted in two-dimensional printing techniques. For example, it may be required to deposit six droplets on a particular pixel location in SDM compared to just one or two droplets in two-dimensional printing. Although the targeting accuracy may be the same, the actual resolution achieved in SDM techniques is generally somewhat less than in two-dimensional printing because the six droplets dispensed may droop or slide towards adjacent pixel locations.

Another difference is that because of the substantially greater amount of material jetted in SDM, the rate at which objects are formed becomes important. Since achieving higher build rates in SDM has been a high priority, initial SDM techniques dedicated all the discharge orifices in the ink jet print heads to dispense a single build material to maximize the build rate of forming the three-dimensional object. However, this sacrifices the ability to selectively dispense multiple colors from the print head when forming the object.

The differences mentioned above are significant and create a number of problems to be resolved. For instance, the amount of material deposited in SDM techniques, both in volume and in mass, can be so substantial that it is generally considered impractical to mount a reservoir directly on the ink jet print head to hold all of the material. Thus, it is typical in most SDM systems to provide a large reservoir at a remote location from the print head that is in communication with the ink print head via a material delivery system having a flexible umbilical cord. However, the large container and umbilical cord must be heated to cause at least some of the build material to become or remain flowable so that the material can flow to the dispensing device. Undesirably, start up times are longer for SDM techniques using ink jet print heads than in two-dimensional printing with ink jet print heads due to the length of time necessary to initially heat the solidified material in the large remote reservoir to its flowable state. In addition, a significant amount of energy is required to maintain the large quantity of material in the flowable state in the reservoir and in the delivery system during the build process. This undesirably generates a significant amount of heat in the build environment.

As higher build speeds have been a priority in SDM techniques, previous expedients have abandoned the color dispensing capabilities of the ink jet print heads and have instead dedicated all of the dispensing orifices of the print heads to dispensing a single build material provided from a single large reservoir. According to these prior art delivery systems multiple remote reservoirs and delivery systems would be necessary in order to dispense multiple materials to produce multiple colors in an object. This would multiply the complexity and cost of such a system and is generally not practical. Thus, there is a need to overcome the limitations of the prior art SFF feed systems that utilize a remotely heated material reservoir. There is also a need to develop a feed system for an ink jet print head used in SFF that can take advantage of the color dispensing capabilities of the print heads.

Previous expedients have been proposed for delivering a phase change ink to a print head for two dimensional printing. For example, in U.S. Pat. No. 5,861,903 to Crawford et al., a supply of ink sticks or blocks are linearly stacked in a loading bin that biases the stick at the end of the stack against a melt plate and the melted ink then drips into the print head in a liquid state. Similarly in U.S. Pat. No. 4,593,292 to Lewis and in U.S. Pat. No. 4,609,924 to DeYoung, a long block of solid ink is biased against a heater plate to melt the ink for delivery of the melted ink to a print head. Also, in U.S. Pat. No. 4,636,803 a supply of cylindrical pellets of solid ink are advanced along an elongated array prior to being melted for use by an ink jet print head. In U.S. Pat. No. 4,631,557 to Cook et al., a cartridge holding a phase change material is heated to allow the melted material to drain into a supply system for a print head. In U.S. Pat. No. 4,682,185 to Martner, a flexible web of hot melt ink is advanced on a spool to a heater where the material is then melted prior to delivery to a ink jet print head. In U.S. Pat. No. 5,341,164 to Miyazawa et al., a number of embodiments of an ink jet supply system are disclosed. In one embodiment an elongated array of solid ink is advanced and broken off at cutouts prior to being melted. In another embodiment, a vertical array of solid spheres of ink are held in single file and are selectively dropped into the print head. However, these prior expedients are directed to feed systems for two-dimensional printing and do not address the problems confronted in SDM techniques, such as how to handle and deliver the significantly larger quantity of build material needed to form three-dimensional objects. For example, the prior linear or array feed systems, if used for SDM, would have to be extremely long in order to hold the quantity of material needed, or require constant manual refilling during the build process. Neither of these alternatives are desirable in SDM.

Another problem that is unique to SDM techniques is that the layers being formed must be shaped or smoothed during the build process to establish a uniform layer. Normalizing the layers is commonly accomplished with a planarizer that removes a portion of the material dispensed in the layers. One such planarizer is disclosed in U.S. Pat. No. 6,270,335 to Leyden et al. However, the planarizer produces waste material during the build process that must be handled. Normally this is not a concern when working with non-reactive materials; however, it can become a problem when reactive materials are used. For example, most photopolymers are reactive, and excessive contact to human skin may result in sensitivity reactions. Thus, most all SFF processes that utilize photopolymer materials require some additional handling procedures in order to minimize or eliminate excessive physical contact with the materials. For example, in stereolithography, operators typically wear gloves when handling the liquid resin and when removing finished parts from the build platform. However, SDM operators who normally handle non-reactive materials consider additional handling procedures inconvenient and, if possible, would prefer they be eliminated. Thus, there is a need to provide a material feed and waste system for SDM that can handle reactive materials without requiring the implementation of special handling procedures.

Several of these problems are addressed in U.S. Pat. No. 6,902,246 assigned to the assignee of this application. In that invention build material is delivered in discrete or quantized amounts by the feed system in a non-flowable state to a magazine on a feed system that is integrated with a waste removal system. The feed system can be used to build three-dimensional objects in color, if desired. That approach made use of a rather sophisticated drum feeding system. There is a need however for a simpler, lower cost, and more reliable system.

These and other difficulties of the prior art are overcome according to the present invention by providing build material to the dispensing device of an SFF apparatus in discrete portions on an as needed basis when the apparatus is forming a three-dimensional object.

BRIEF SUMMARY OF THE INVENTION

The present invention provides its benefits across a broad spectrum of SFF processes by providing a build material to the dispensing device of a SFF apparatus in discrete portions on an as needed basis when forming a three-dimensional object.

It is one aspect of the present invention to provide a new build material feed system for an SFF apparatus that overcomes the above-mentioned disadvantages of the prior art.

It is another aspect of the present invention to provide a simpler and more reliable feed system.

It is a feature of the present invention to provide this new build material feed system for an SFF apparatus that takes advantage of the multiple color dispensing capabilities of an ink jet print head when forming three-dimensional objects.

It is a feature of the present invention that the feed system delivers the build material to the dispensing device as needed in discrete amounts to form three-dimensional objects.

It is still yet another advantage of the present invention feed system that ink jet print heads can be utilized to build three-dimensional objects by SFF techniques having visual attributes such as color.

These and other aspects and features are provided by a method for dispensing a build material in a flowable state from a dispensing device of a solid freeform fabrication apparatus to form a three-dimensional object, the method including at least the steps of delivering discrete amounts of build materials held in separate containers to at least one hopper on the dispensing device; delivering discrete amounts of support material held in separate containers to at least one hopper on the dispensing device; moving the build materials containers in the hopper to build material receptacles of the dispensing device and moving the support material containers in the hopper to a support material receptacle of the dispensing device; changing the build materials and the support material from the non-flowable state to a flowable state after delivery of the build materials and the support material to the receptacle of the dispensing device; dispensing the build materials in the build material receptacles and dispensing the support material in the support material receptacle by the dispensing device in the flowable state in a layerwise fashion to form the three-dimensional object and to form supports for the three-dimensional object; wherein said moving step comprises alternately clamping and releasing said containers of build materials and support material in said build material receptacles and said support material receptacle.

These aspect and features are also provided by providing a build material feed system for a solid freeform fabrication apparatus, the build material having a non-flowable state and a flowable state, the apparatus having a dispensing device for dispensing the build material, the feed system including at least a hopper for holding discrete containers of the build material in the non-flowable state in communication with a receptacle of the dispensing device; means for moving the discrete containers of build material in the hopper to a receptacle of the dispensing device; means for changing the discrete amounts of build material from the non-flowable state to the flowable state after delivery of the build material to the receptacle of the dispensing device; means for dispensing the build material in the receptacle by the dispensing device in a layerwise fashion; and wherein said means for moving the discrete containers of build material in the hopper to a receptacle of the dispensing device comprises alternately clamping and releasing said discrete containers of build materials in said receptacle of the dispensing device.

These aspect and features are also provided by providing a solid freeform fabrication apparatus for forming a three-dimensional object in a layerwise fashion by dispensing a build material in a flowable state, the apparatus including at least a build environment having a build platform for supporting the three-dimensional object while it is being formed; at least one dispensing device adjacent the build platform for dispensing the build material in the flowable state to form layers of the three-dimensional object, the dispensing device having at least one hopper for holding the build material containers; a transferring means for periodically transferring build material containers from the hopper to a receptacle in the dispensing device; a motion means for moving the dispensing device and the build platform respectively when dispensing the build material; a heating means in the receptacle of the dispensing device for changing the build material from the non-flowable state to the flowable state; and wherein said transferring means for periodically transferring build material containers from the hopper to a receptacle of the dispensing device comprises alternately clamping and releasing said discrete containers of build materials in said receptacle of the dispensing device.

These and other aspects, features, and advantages are achieved according to the method and apparatus of the present invention that employs a unique build material feed system that delivers a discrete amount of build material on an as needed basis in a non-flowable state to a dispensing device. After the material is delivered to the dispensing device, it is changed from the non-flowable state to a flowable state wherein it may then be selectively dispensed to form a three-dimensional object in a layerwise fashion.

BRIEF DESCRIPTION OF THE DRAWINGS

These and other aspects, features and advantages of the present invention method and apparatus will become apparent upon consideration of the following detailed disclosure of the invention, especially when it is taken in conjunction with the accompanying drawings wherein.

To facilitate understanding, identical reference numerals have been used, where possible, to designate identical elements that are common to the figures.

DETAILED DESCRIPTION OF THE PREFERRED EMBODIMENTS

Figure 1:
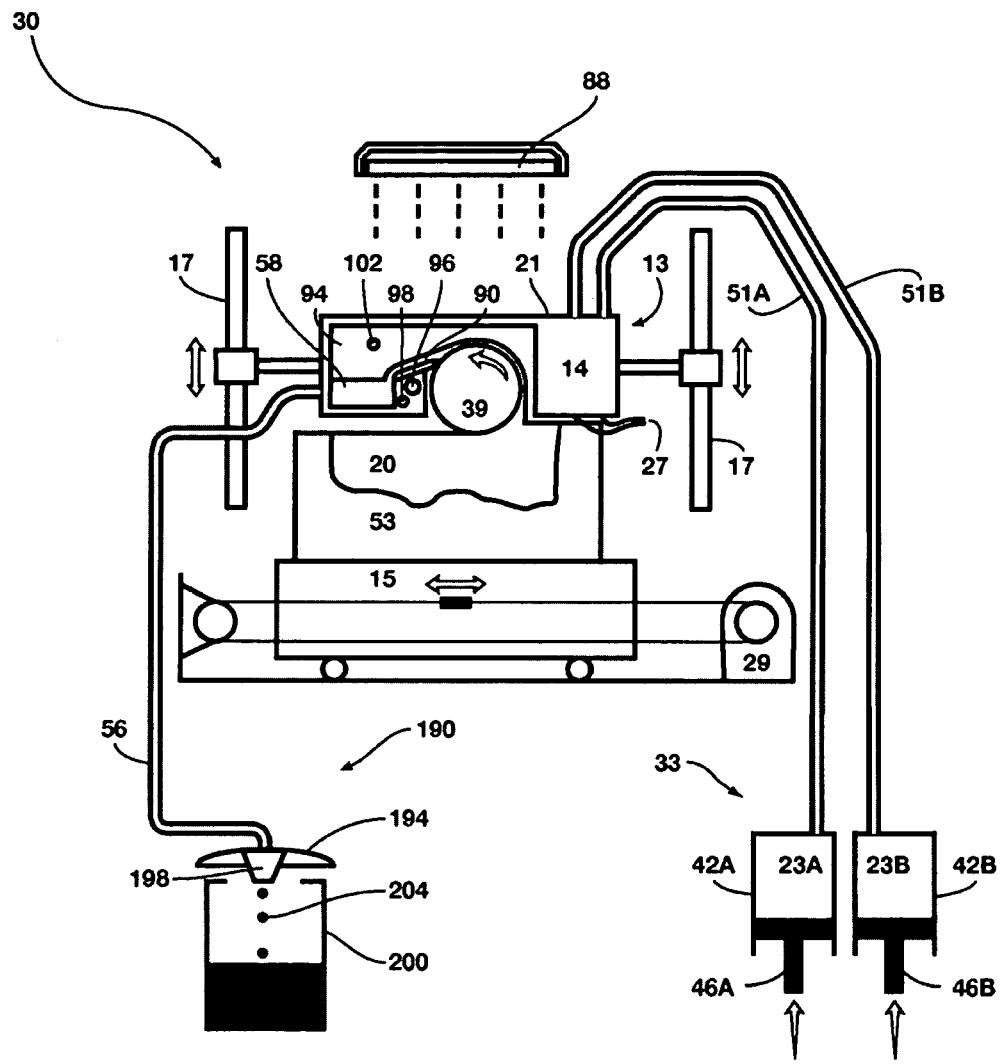
FIG. 1 is a diagrammatic side view of a prior art solid deposition modeling apparatus.

The present invention provides its benefits across a broad spectrum of SFF processes. While the description that follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

While the present invention is applicable to all SFF techniques and objects made therefrom, the invention will be described with respect to solid deposition modeling utilizing a build material that is dispensed in a flowable state. However it is to be appreciated that the present invention can be implemented with any SFF technique utilizing a wide variety of build materials. For example, the build material can be a photocurable or sinterable material that is heated to a flowable state but when solidified may form a high viscosity liquid, a semi-solid, a gel, a paste, or a solid. In addition, the build material may be a composite mixture of components, such as a mixture of photocurable liquid resin and powder material such as metallic, ceramic, or mineral, if desired.

As used herein, the term "a flowable state" of a build material is a state wherein the material is unable to resist shear stresses that are induced by a dispensing device, such as those induced by an ink jet print head when dispensing the material, causing the material to move or flow. Preferably the flowable state of the build material is a liquid state, however the flowable state of the build material may also exhibit thixotropic properties. The term "solidified" and "solidifiable" as used herein refer to the phase change characteristics of a material where the material transitions from the flowable state to a non-flowable state. A "non-flowable state" of a build material, as used herein, is a state wherein the material is sufficiently self-supportive under its own weight so as to hold its own shape. A build material existing in a solid state, a gel state, a paste state, or a thixotropic state, are examples of a non-flowable state of a build material for the purposes of discussion herein. Further, the term "cured" or "curable" refers to any polymerization reaction. Preferably the polymerization reaction is triggered by exposure to radiation or thermal heat. Most preferably the polymerization reaction involves the cross-linking of monomers and oligomers initiated by exposure to actinic radiation in the ultraviolet or infrared wavelength band. Further, the term "cured state" refers to a material, or portion of a material, in which the polymerization reaction has substantially completed. It is to be appreciated that as a general matter the material can easily transition between the flowable and non-flowable state prior to being cured, however, once cured, the material cannot transition back to a flowable state and be dispensed by the apparatus. Additionally, the term "support material" refers to any material that is intended to be dispensed to form a support structure for the three-dimensional objects as they are being formed, and the term "build material" refers to any material that is intended to be dispensed to form the three-dimensional objects. The build material and the support material may be similar materials having similar formulations but, for purposes herein, they are to be distinguished only by their intended use. A preferred method for dispensing a curable phase change material to form a three-dimensional object and for dispensing a non-curable phase change material to form supports for the object is disclosed in U.S. Pat. No. 6,841,116 entitled "Selective Deposition Modeling with Curable Phase Change Materials", assigned to the assignee of the present invention and which is incorporated by reference as set forth in full. A preferred curable phase change material and non-curable phase change support material is disclosed in U.S. Pat. No. 6,841,589 entitled "Ultra-Violet Light Curable Hot Melt Composition", which also is incorporated by reference as set forth in full.

Referring to FIG. 1 there is illustrated generally by the numeral 30 a prior art solid freeform fabrication apparatus of the SDM type that can be adapted to incorporate the feed system of the instant invention. This apparatus 30 is schematically shown including a material feed system indicated generally by the numeral 33 and waste system indicated generally by the numeral 190. The details of this prior art feed system 33 will be shown and explained later in FIG. 2. The build platform 15 (of FIG. 1) is reciprocally driven by conventional drive means 29. The dispensing trolley 21 is precisely moved by actuation means 17 vertically to control the thickness of the layers of the object 20. The actuation means 17 comprises precision lead screw linear actuators driven by servomotors. The ends of the linear actuators 17 reside on opposite ends of the build environment 13 and in a transverse direction to the direction of reciprocation of the build platform. However, for ease of illustration in FIG. 1 they are shown in a two-dimensionally flat manner giving the appearance that the linear actuators are aligned in the direction of reciprocation of the build platform 15. Although they may be aligned with the direction of reciprocation, it is sometimes preferred they be situated in a transverse direction so as to optimize the use of space within the apparatus.

In the build environment illustrated generally by numeral 13 in FIG. 1, there is shown by numeral 20 a three-dimensional object being formed with integrally formed supports 53. The object 20 and supports 53 both reside in a sufficiently fixed manner on the build platform 15 so as to sustain the acceleration and deceleration effects during reciprocation of the build platform 15 while still being removable from the platform. In order to achieve this, it is desirable to dispense at least one complete layer of support material on the build platform 15 before dispensing the build material since the support material is designed to be removed at the end of the build process. A feed system, shown generally by the numeral 33 supplies build material 23A and support material 23B. A prior art feed system will be described in FIG. 2. The build material identified by numeral 23A is dispensed by the dispensing device 14 that is in fluid flow communication with the material feed portion of system 33 to form the three-dimensional object 20. The support material, identified by numeral 23B, is dispensed in the same manner by dispensing device 14 to form the supports 53. Containers identified generally by numerals 42A and 42B, respectively hold a discrete amount of these two materials 23A and 23B. Lines 51A and 51B, respectively deliver the material to dispensing device 14, which in the preferred embodiment is an ink jet print head having a plurality of dispensing orifices 27.

Preferably the materials 23A and 23B of FIG. 1 are phase change materials that are heated to a liquid state, and heaters (not shown) are provided on the lines 51A and 51B to maintain the materials in a flowable state as they are delivered to the dispensing device 14. In this embodiment the dispensing device is an ink jet print head 14 configured to dispense both materials from a plurality of dispensing orifices 27 so that both materials can be selectively dispensed in a layerwise fashion to any location in any layer being formed. When the dispensing device 14 needs additional material 23A or 23B, extrusion bars 46A and 46B, respectively are engaged to extrude the material from the containers 42A and 42B, through the lines 51A and 51B, and to discharge orifices 27 of the dispensing device 14.

The dispensing trolley 21 in the embodiment shown in FIG. 1 includes a heated planarizer 39 that removes excess material 23A and 23B from the layers being dispensed to normalize the dispensed layers. The heated planarizer 39 contacts the build and support materials 23A and 23B in their non-flowable state and, because it is heated, locally transforms some of the materials to a flowable state. Due to the forces of surface tension, the excess flowable materials 23A and 23B adhere to the surface of the planarizer 39, and as the planarizer 39 rotates the adhered materials are brought up to the skive 90 which is in contact with the planarizer 39. The skive 90 separates the excess materials 23A and 23B that are now waste material from the surface of the planarizer 39 and directs the flowable material into a waste reservoir, identified generally by numeral 94 located on the trolley 21. A heater 96 and thermistor 98 on the waste reservoir 94 operate to maintain the temperature of the waste reservoir at a sufficient level so that the waste material 58 in reservoir 94 remains in a flowable state.

Waste reservoir 94 is connected to a heated waste umbilical tube 56 for delivery of the waste material 58 to waste system 190. Waste material 58 is allowed to flow via gravity down to the waste receptacle 200. The operation of waste system 190 is described in co-pending application U.S. Ser. No. 11/230,030, which is incorporated by reference into this application in its entirety.

In the prior art system of FIG. 1, an additional detection system is provided in the waste system to prevent the waste material 58 from overflowing the waste reservoir 94. The system comprises an optic sensor 102 provided in the waste reservoir 94 that detects an excess level of waste material 58 in the reservoir 94. If the level of the waste material 58 in the waste reservoir 94 rises above a set level, the sensor 102 detects it. The sensor 102 in turn provides a signal to a computer controller (not shown), which shuts down the apparatus. This prevents waste material from flooding the components inside the apparatus 10 in the event of a malfunction of the feed and waste system 86. The apparatus 10 can then be serviced to correct the malfunction, thus preventing excessive damage to the apparatus.

In the prior art system shown in FIG. 1, the build material 23A is a phase change material that is cured by exposure to actinic radiation. After the curable phase change material 23A is dispensed in a layer it transitions from the flowable state to a non-flowable state. After a layer has been normalized by the passage of the planarizer 39 over the layer, the layer is then exposed to actinic radiation by radiation source 88 to cure the build material 23A. Preferably the actinic radiation is in the ultraviolet or infrared band of the spectrum. It is important, however, that planarizing occurs prior to exposing a layer to the radiation source 88. This is because the preferred planarizer can only normalize the layers if the material in the layers can be changed from the non-flowable to the flowable state. This cannot occur if the material 23A is first cured.

In conjunction with the curable build material 23A, a non-curable phase change material is used for the support material 23B. Since the support material 23B cannot be cured, it can be removed from the object and build platform, for example, by being dissolved in a solvent. Alternatively the support material 23B can be removed by application of heat to return the material to a flowable state, if desired.

Figure 2:
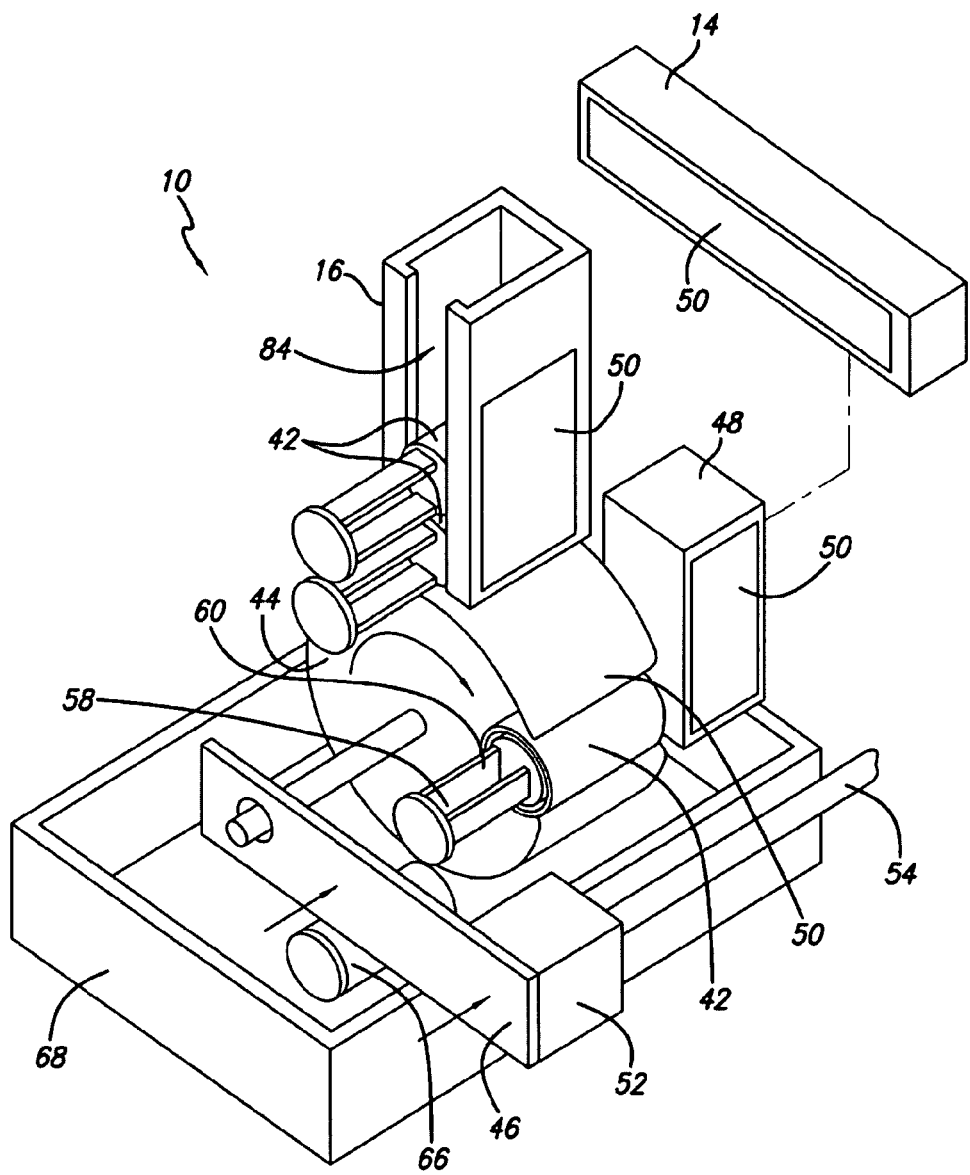
FIG. 2 is a diagrammatic isometric view of a prior art feed system for use with the solid deposition modeling apparatus of FIG. 1.

As seen in FIG. 2, there is shown generally by the numeral 10 a quantized feed system that is described in some detail in U.S. Pat. No. 6,902,246, which is incorporated by reference into this application. In this feed system a hopper 16 forms a magazine for holding a plurality of containers 42. The containers can contain either build material or support material. Referring back to FIG. 1 build material 23A is in containers 42A. Support material 23B is in containers 42B. The containers hold a discrete amount of material that is initially in a non-flowable state. The containers 42 (A or B) are cartridges containing unused material and are initially loaded into the magazine manually by an operator, however the loading process could be automated, if desired. In this embodiment the cartridges are stacked in a linear fashion. The hopper comprises a mechanical drum indexer 44 that receives the cartridges and then rotates them into a position where an extrusion bar 46 applies force to the cartridge to remove the build material from the cartridge. The material is removed through an orifice at its end (not shown) and into a filter 48. The extrusion bar 46 is biased axially along a shaft 54 by a feed motor 52. As the extrusion bar 46 applies the force to expel the build material, the material passes through the filter 48 and is delivered to a dispensing device 14. Details of a dispensing device are shown in U.S. Pat. No. 6,902,246. It is to be appreciated that the amount of force applied by the extrusion bar exerts a substantial amount of shear stress on the material in the cartridge to expel the material. The amount of this force is so substantial that the material need not be in a flowable state to be expelled from the cartridge. Depending on the build material and the specifications of the dispensing device, the filter may be omitted. However, if an ink jet print head is used as the dispensing device, it may be desirable to run the build material through a 5-micron filter prior to delivering the material to the print head. Alternatively the filter may be omitted from the SDM apparatus if the material is run through a filter prior to loading the material in the cartridges. In this embodiment the discrete amounts of build material in the cartridges are delivered to hopper 16 while the build material is in a non-flowable state. Heater elements, identified by numeral 50 are situated on the hopper 16, on the indexer 44, on the filter 48, and on the dispensing device 14. The heater elements 50 provide thermal energy to change the build material to the flowable state and to maintain the build material in the flowable state as it moves through the delivery system to the print head. Preferably the build material transforms from the non-flowable state to the flowable state in the cartridge prior to being delivered to the indexer 44, although this is not required.

Unique to the prior art feed system in FIG. 2 is the integration of a waste removal means with the build material feed system 10. Waste material generated during planarizing is delivered to a waste receptacle 60 provided on the container 42. This particular method of waste removal is not an aspect of the instant invention. The instant invention uses a waste removal system as described in the aforementioned co-pending application U.S. Ser. No. 11/230,030 and is shown as system 190 in FIG. 1.

Figure 3:
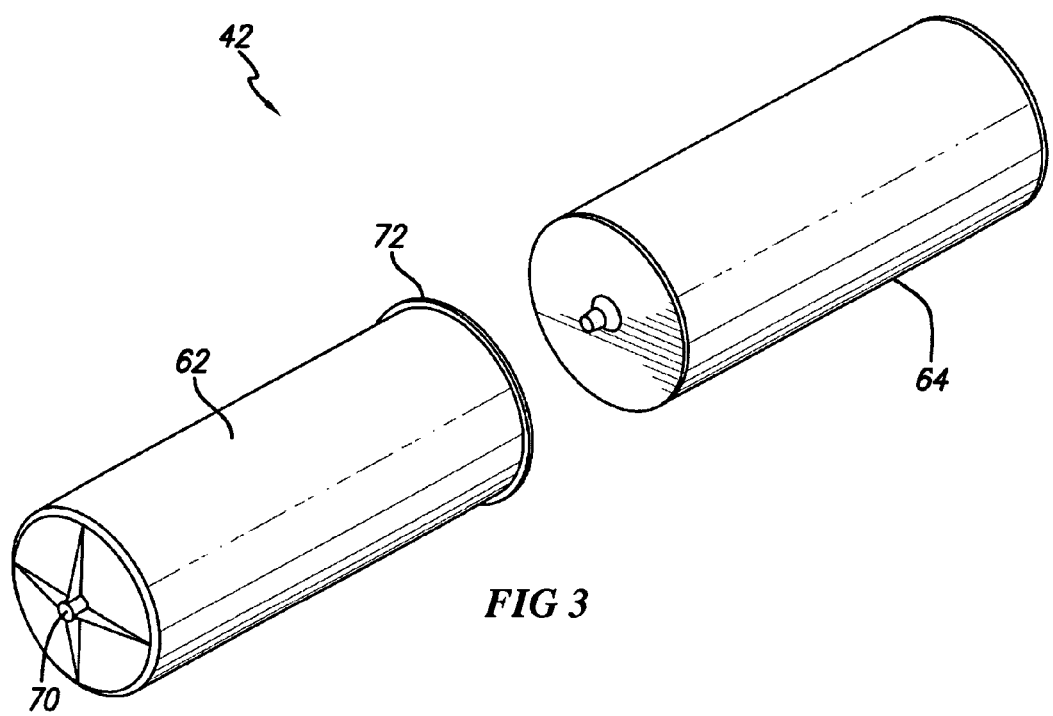
FIG. 3 is a diagrammatic isometric view of a container used to hold a discrete amount of build material for use in the embodiment shown in FIG. 2.

Each container 42 comprises a syringe portion 62 and plunger portion 64. These are shown for clarification in FIG. 3, showing a syringe cartridge system represented generally by the numeral 42. The syringe portion forms a cylinder having a small opening 70 at one end for dispensing the material 23A or 23B, as appropriate. As the plunger portion 64 is driven into the syringe portion 62, the material 23A or 23B in the syringe portion of the corresponding container is expelled through a small orifice 70 at the end of the syringe. Extrusion paddle bar 46 acts on the plunger portion 64 to drive the plunger into the syringe portion 62 and thereby remove the material from the container.

Once substantially all of the material 23A or 23B has been delivered to the dispensing device 14, indexer barrel 44 then rotates and ejects the sealed cartridge, as shown by numeral 66, into a waste drawer or bin 68. After the sealed cartridge 66 is ejected, the indexer then replaces the ejected container by loading a new container from magazine 16 of FIG. 2.

It is preferred that an SFF apparatus shown in FIG. 1 be provided with two feed systems, of which for the ease of illustration just one is shown in FIG. 2 at numeral 10. One feed system delivers the build material 23A, and the other delivers the support material 23B. The support material cartridges can be configured such that they cannot be inserted into the build material magazine. Likewise, the build material cartridges can be configured such that they cannot be inserted into the support material magazine. Such special keying of the cartridges and magazines eliminates the possibility of inadvertently mixing the materials in the apparatus.

The prior art feed apparatus of FIG. 2 provided an improvement over previous feed systems for SDM devices in that it provided material in discrete quantized amounts and obviated the need for storing large amounts of materials in a flowable state in a remote reservoir. The quantized aspect of the delivery system also allowed the building of three-dimensional objects by SDM techniques with special attributes such as changing colors. The need for specialized mechanical devices such as the drum indexer however, defined a need for a simpler system, with lower cost and more reliable operation. The instant invention described below is addressed at those needs.

Figure 4:
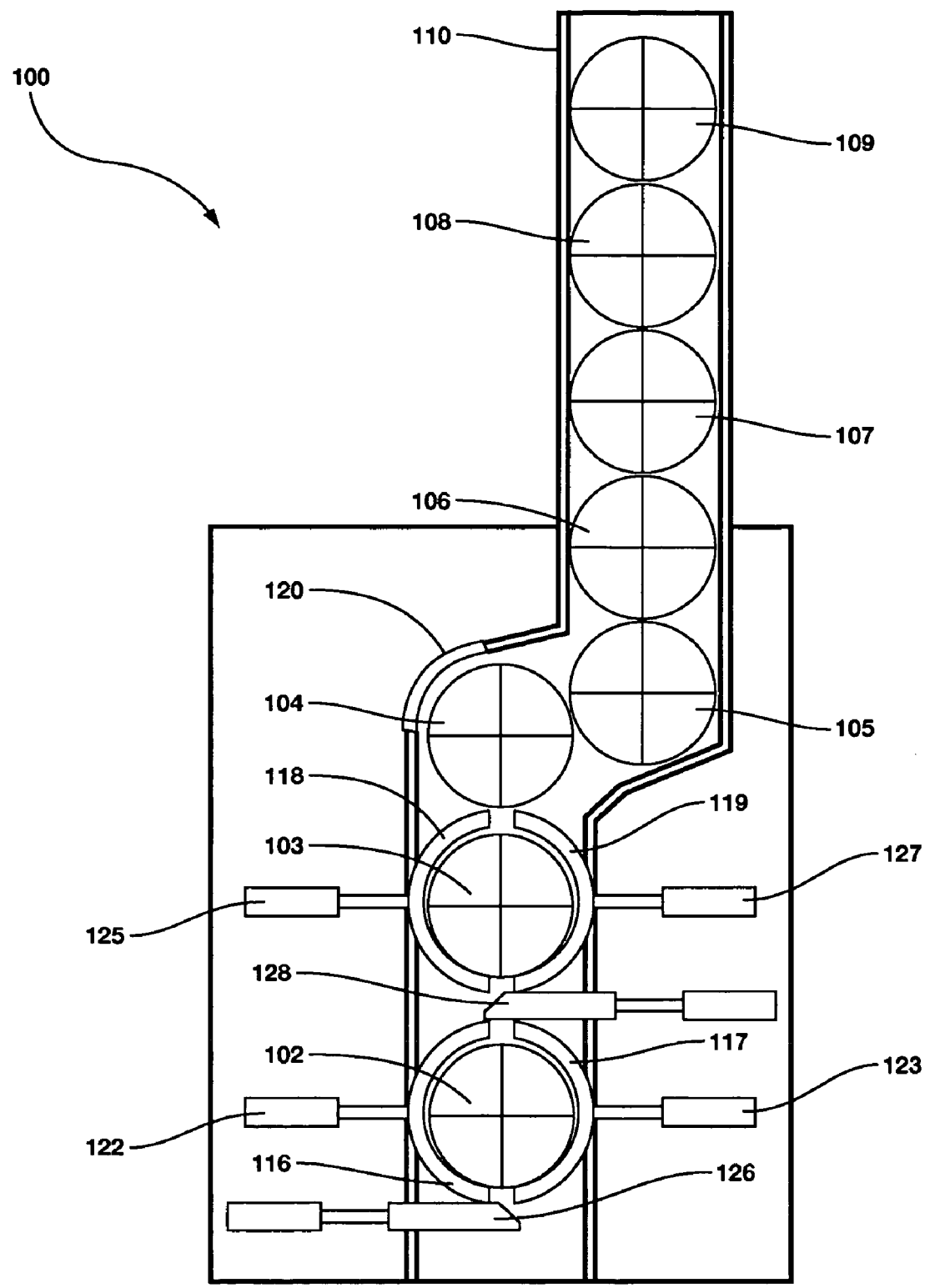
FIG. 4 is a diagrammatic end view of the present invention feed system.

As shown in FIG. 4, indicated generally by the numeral 100, a schematic representation of a simpler; more reliable, and less costly dispensing device of the instant invention. The clamp feed system makes use of the technology already in place of using quantized feed cartridges as described in the prior art of FIG. 2. FIG. 4 is an end view of the clamp feed dispensing device. Each of the cartridges 102, 103, 104, 105, 106, 107, 108, and 109 are viewed on the end from which the material will exit the cartridges, that is from the end represented by 70 in FIG. 3. Cartridge 102 is the current feed cartridge. Cartridge 103 is a first preheat cartridge. Cartridge 104 is a second preheat cartridge. The section of the clamp feed system comprising cartridges 102, 103, and 104 will be referred to as the receptacle of the dispensing device. Each of the cartridges above 104 is in a hopper 110, waiting to fall down by gravity and eventually be fed into the receptacle of the clamp feed dispensing system. Elements 116, 117, 118, and 119 are heated clamp elements configured to hold cartridges rigidly in place during feeding. Element 120 is also a heater. Stepper motors 122, 123, 125, and 127 drive clamps 116, 117, 118, and 119 together and can also retract the clamps far enough to allow cartridges from above to fall into place before driving the clamping action. Retractable stops 126, 128 are provided to catch cartridges falling from above as needed. Materials in cartridges above the preheat systems (cartridges 105-109) are in a solid state. Cartridge 104 is pre-heated by heater 120 and the material therein begins to soften. Preheat clamp elements 118 and 119 preheat the material in cartridge 103 to a liquid state. Preheat clamps 116 and 117 maintain the material in that liquid state.

Figure 5:
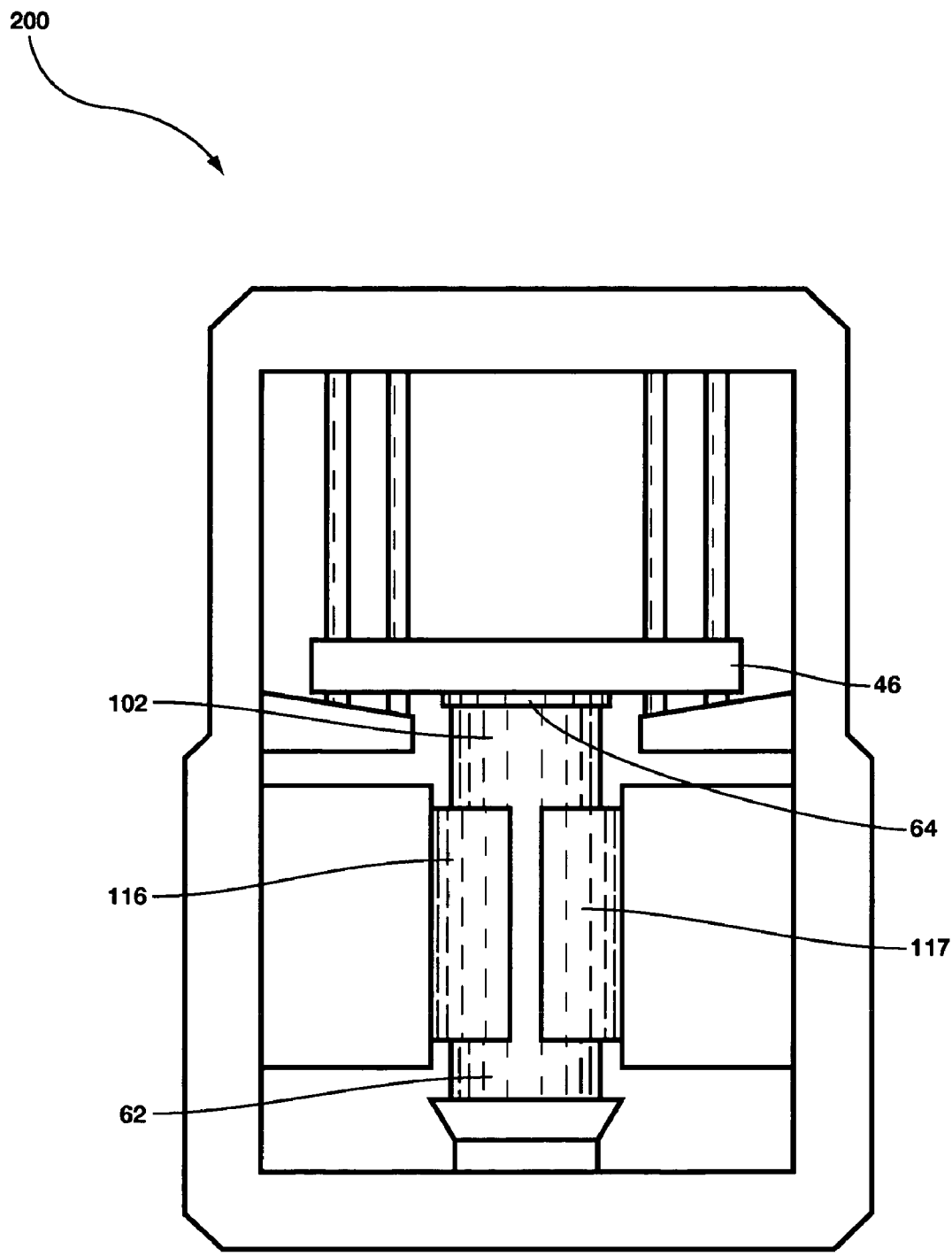
FIG. 5 is a cross sectional top view of the present invention feed system.

As shown in FIG. 5, a cross sectional top view of the feed system is indicated generally by numeral 200 to show the feed mechanism. For clarity of presentation the system is shown with only one cartridge, feed cartridge 102. The feed chute 110, see FIG. 4 briefly, is omitted for the sake of clarity. Extrusion paddle 46 is driven by stepper motors to drive plunger portion 64 into syringe portion 62. As shown, plunger 64 is almost completely inserted into syringe 62. Cartridge 102 is being held by clamp elements 116 and 117.

In operation extrusion paddle 46 drives plunger portion 64 into syringe portion 62 until substantially all of the material is ejected. Extrusion paddle 46 then retracts. The clamp stepper motors operate to open the clamps to first allow the feed cartridge to fall into a collection bin (not shown) below. Stop 128 of FIG. 4 keeps other cartridges from falling during this operation. Stop 128 is then opened and stop 126 closed to allow the first preheat cartridge 103 (with the material already in a liquid state) and the cartridges above to each fall down by one position. Extrusion paddle 46 is then re-engaged and ready to again drive the cartridge plunger 64 into the syringe portion 62 of the new feed cartridge.

A number of alternate configurations different from the one described here are possible to operate the steps of alternately clamping and releasing the containers of build and support materials. Fewer stepper motors or alternates to stepper motors could be used. The instant invention anticipates these alternatives. The key concept is the process of clamping and heating of the cartridges while material is being dispensed from the first or current feed cartridge followed by the alternate movement of opening of the clamp system to allow spent cartridges to fall out of the system and for the cartridges placed above the feed cartridge to fall into place by gravity. This sequence is alternatively repeated to allow continuous operation of a solid freeform fabrication apparatus utilizing phase change materials.

In yet another embodiment, each hopper is associated with a unique visual characteristic and discrete amounts of build material indicative of the associated visual characteristic are delivered to the appropriate hoppers. Preferably, a color additive such as a dye or pigment is provided in the discrete amounts of build material for the colors cyan, magenta, yellow, and black. The different colored build materials are selectively delivered to the specific hoppers to enable the SFF apparatus to form three-dimensional objects in color. This is accomplished by providing a plurality of discharge orifices to be in communication with each receptacle associated with a given hopper so that the dispensing device can selectively dispense the build material with any color additive to any coordinate in any layer on the three-dimensional object.

Alternatively, the hoppers may be associated with different mechanical properties related to different formulations of build materials in which the discrete build material feed system would enable the formation of non-homogeneous three-dimensional objects by any SFF technique.

Figure 6:
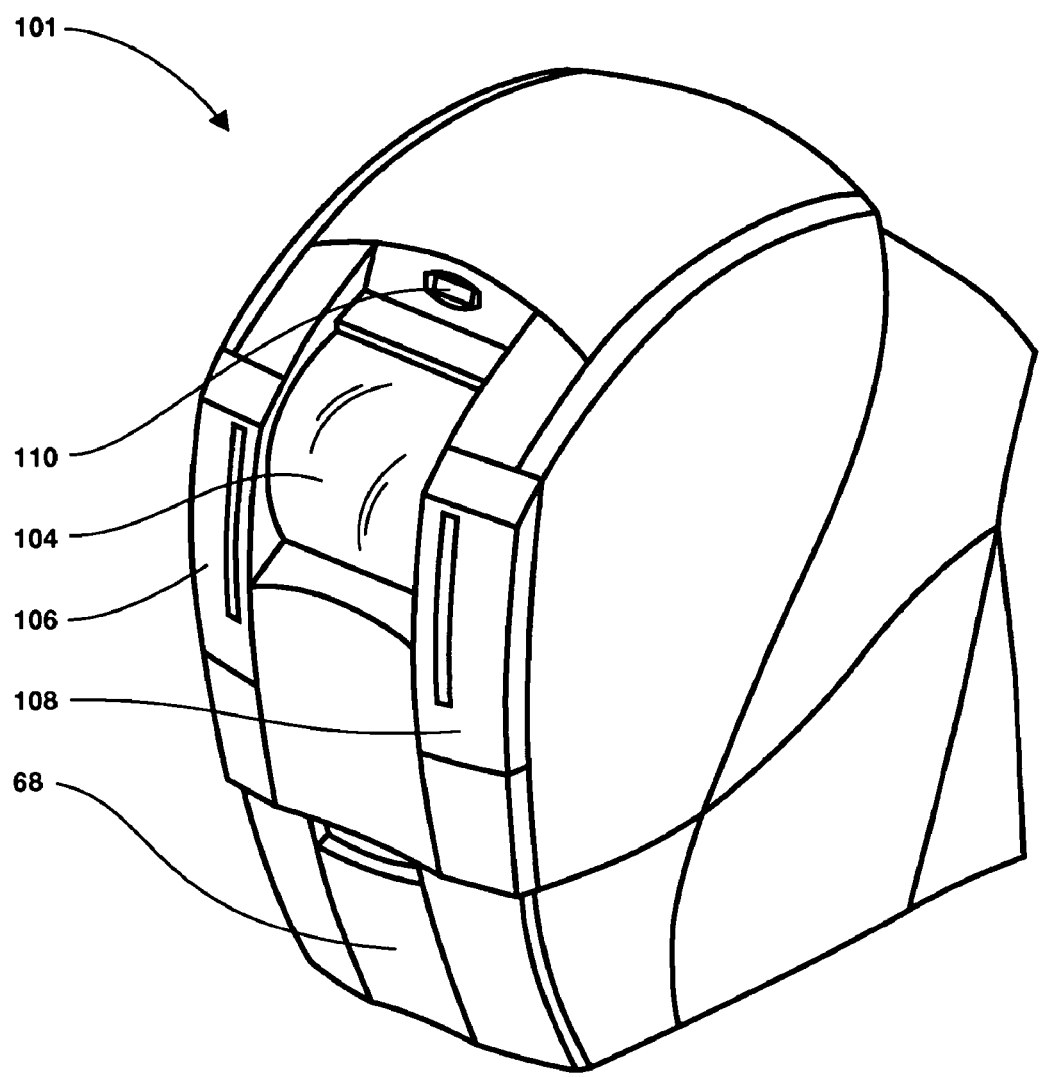
FIG. 6 is an isometric view of a SDM apparatus of the embodiment shown schematically in FIG. 1

Now referring to FIG. 6, the SDM apparatus schematically shown in FIG. 1 is shown at 101. To access the build environment, a slidable door 104 is provided at the front of the apparatus. The door 104 does not allow radiation within the machine to escape into the environment. The apparatus is configured such that it will not operate or turn on with the door 104 open. In addition, when the apparatus is in operation the door 104 will not open. A build material feed door 106 is provided so that the build material containers can be inserted into the apparatus. A support material feed door 108 is also provided so that the support material can be inserted into the apparatus. A waste drawer 68 is provided at the bottom end of the apparatus 10 so that the expelled waste containers can be removed from the apparatus. A user interface 110 is provided which is in communication with the external computer 35 previously discussed which tracks receipt of the print command data from the external computer.

What have been described are preferred embodiments in which modifications and changes may be made without departing from the spirit and scope of the accompanying claims.

What is claimed is:

1. A build material feed system for a solid freeform fabrication apparatus, the build material having a non-flowable state and a flowable state, the apparatus having a dispensing device for dispensing the build material, the feed system comprising:
   a. a hopper that holds discrete containers of the build material in the non-flowable state in communication with a receptacle of the material feed system;
   b. at least one heater that changes amounts of build material in the discrete container from the non-flowable state to the flowable state after delivery of the discrete container to the receptacle of the material feed system;
   c. an extrusion assembly that expels build material from the discrete container to the dispensing device by applying an extrusion force to the discrete container;
   d. at least one ink jet print head provided in the dispensing device for dispensing the build material in a layerwise fashion; and
   e. a clamp feed system that selectively clamps the discrete container by applying a clamping force with at least one movable clamp to the discrete container while the extrusion assembly expels build material from the discrete container to the dispensing device and that selectively releases the discrete container once substantially all of the build material has been expelled by discontinuing the clamping force.

2. The build material feed system of claim 1 wherein the hopper is positioned above the receptacle to allow the discrete containers to fall down by gravity into the receptacle of the material feed system.

3. The build material feed system of claim 1 wherein the at least one ink jet print head comprises a plurality of discharge orifices.

4. The build material feed system of claim 1 wherein the dispensing device comprises at least two hoppers, at least one hopper adapted for receiving the build material to be dispensed to form the three-dimensional object, and at least another hopper adapted for receiving a support material to be dispensed to form supports for the three-dimensional object.

5. The build material feed system of claim 1 wherein at least one heater is provided on the receptacle.

6. The build material feed system of claim 1 wherein at least one heater is provided in a clamp of the clamp feed system.

7. The build material feed system of claim 1 further comprising a waste removal system that delivers waste material to a portion of the discrete container.

8. The build material feed system of claim 1 comprising a plurality of hoppers, each hopper being associated with a different build material having a unique visual characteristic.

9. The build material feed system of claim 8 wherein the unique visual characteristic associated with the hoppers is color.

10. The build material feed system of claim 9 wherein the color is selected from the group consisting of cyan, magenta, yellow, and black.

11. The build material feed system of claim 10 wherein the at least one ink jet print head has a plurality of discharge orifices that can selectively dispense the build materials having unique visual characteristics.

12. The build material feed system of claim 1 wherein the clamp feed system comprises a pair of clamps between which the discrete container is selectively clamped.

13. The build material feed system of claim 12 wherein the clamp feed system comprises a first pair of preheat clamps.

14. The build material feed system of claim 13 wherein the clamp feed system comprises a second pair of preheat clamps that selectively clamps the discrete container while the extrusion assembly expels the build material.

15. The build material feed system of claim 14 further comprising a retractable stop that is positioned between the first pair of preheat clamps and the second pair of preheat clamps.

16. The build material feed system of claim 12 further comprising a retractable stop that is positioned between the pair of clamps and a waste drawer that receives the discrete container after substantially all of the build material has been expelled.

17. The build material feed system of claim 12 wherein the clamp feed system comprises at least one stepper motor that moves at least one clamp of the pair of clamps with respect to the other clamp of the pair of clamps to selectively clamp and selectively release the discrete container.

* * * * *